May 16, 1961 C. H. BASSETT 2,984,613
FUEL ELEMENT FOR NUCLEAR REACTORS
Filed April 9, 1959 2 Sheets-Sheet 1
Fig. 1.
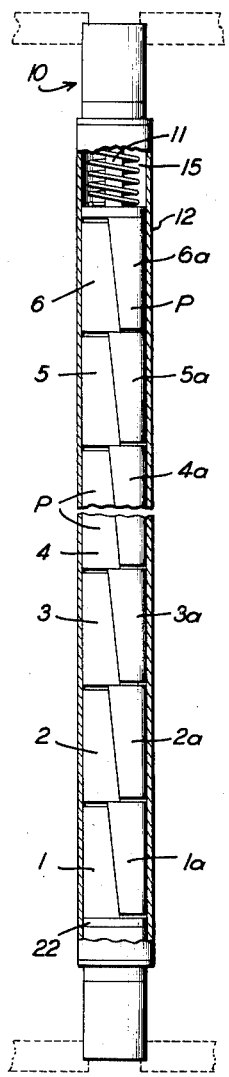
Fig. 2.
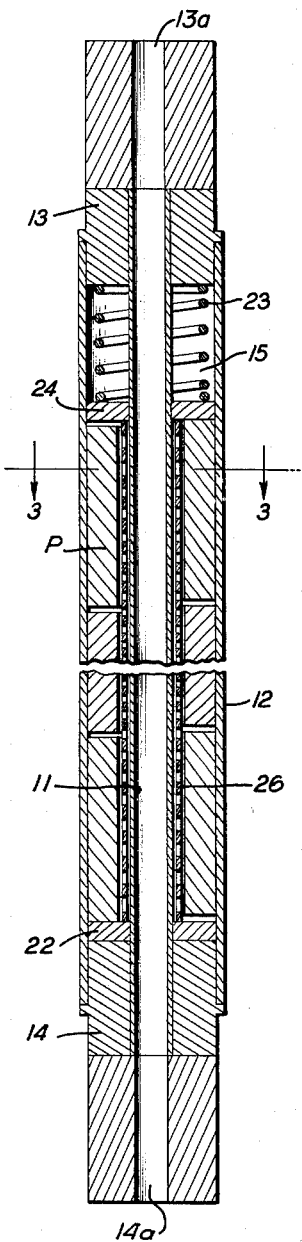
Fig. 4.
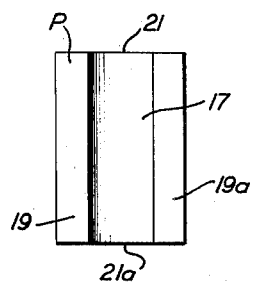
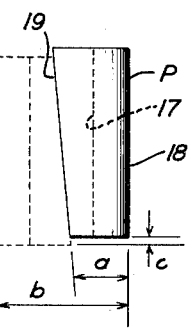
Fig. 5.
Fig. 6.
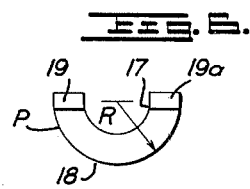
INVENTOR
CHARLES H. BASSETT
BY H. Fredrick Hamann
ATTORNEY May 16, 1961 C. H. BASSETT 2,984,613
FUEL ELEMENT FOR NUCLEAR REACTORS
Filed April 9, 1959 2 Sheets-Sheet 2
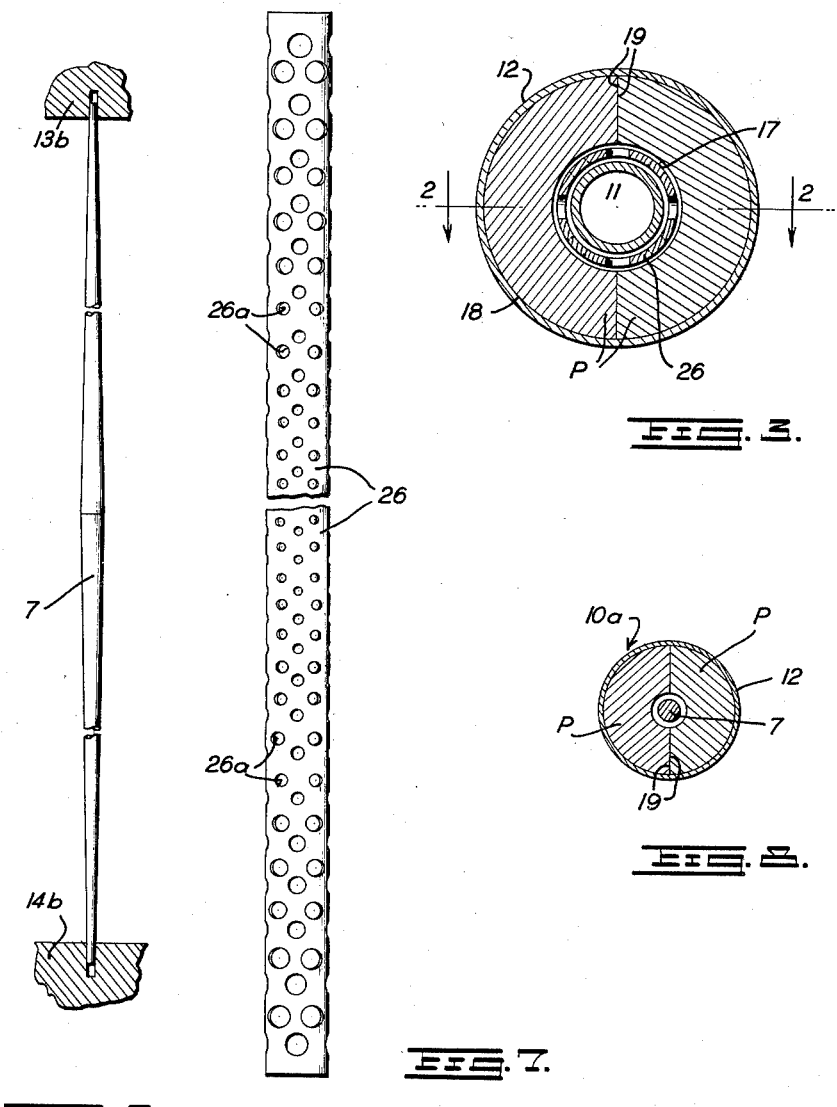
INVENTOR
CHARLES H. BASSETT
BY H. Fredrick Hamann
ATTORNEY United States Patent Office 2,984,613
Patented May 16, 1961

2,984,613

FUEL ELEMENT FOR NUCLEAR REACTORS

Charles H. Bassett, Riverdale, Md., assignor, by mesne assignments, to the United States of America as represented by the United States Atomic Energy Commission Filed Apr. 9, 1959, Ser. No. 805,212

6 Claims. (Cl. 204—193.2)

This invention relates to fuel elements for nuclear reactors and, more particularly, to a fuel element particularly adapted for use in reactors of high power density used to generate steam for the production of electricity.

The present trend of thermal-reactor research is toward ceramic compounds, since an apparent limit on reactor operating temperatures and fuel burnup is imposed by swelling of metallic fuels at operating temperatures above 400° C. This swelling of metallic fuel is due in part to fission-product gases. When four atoms of U–235 are fissioned, one of the eight fission-product atoms formed is either xenon or krypton which are practically insoluble in uranium and are under very high pressure within the solid fuel lattice structure. As the maximum achievable burnup of metallic fuel is inversely related to the temperature of the fuel during irradiation, the theory is that metallic uranium becomes weaker at high temperatures, thereby permitting the expansion of internal fission-product gases to increase the size of the fuel elements by swelling to unacceptable limits.

One of the methods for overcoming the swelling problem is to use high density ceramic materials, such as uranium dioxide ($UO_2$) enriched with U–235, in the form of sintered cylindrical pellets which have a high melting point (2760° C.), good mechanical strength, good resistance to radiation damage, and high burnups. Burnups greater than 25,000 Mwd./ton appear feasible without appreciable damage to the $UO_2$ and the structural confining material. The release of fission-product gases xenon and krypton from the irradiated $UO_2$ is diffusion controlled and hence high density $UO_2$ without interconnecting pores releases only very small amounts of the gases.

To prevent the escape of fission-product gases, sintered cylindrical ceramic fuel pellets have heretofore been housed within a metallic tube of compatible material, such as austenitic stainless steel or zirconium. Due to the relatively low neutron absorption of zirconium, it is preferred as a tubing material to effect savings through the use of uranium of lower enrichment, and through the reduction in the critical mass of uranium.

The thermal coefficient of expansion of stainless steel is greater than that of $UO_2$, whereas zirconium expansion is less than $UO_2$. This factor is of importance in fuel element design. Where a gap exists between the fuel and the tubing, the fuel pellet must operate at high temperatures in order to transfer heat across the gap. Heretofore, it has been the practice to grind cylindrical fuel pellets to close tolerances for snug engagement within close tolerance tubing, and such precision fabrication is very costly. To avoid finishing cylindrical pellets and tubing to exact size, fuel pellets have been thermally bonded to the tubing by a lead filler, as disclosed in Patent 2,838,452, issued June 10, 1958, to John M. West. Such a lead filler results in an increase in the loss of neutrons by parasitic capture, has a low coefficient of heat conductivity and is fluid at relatively low operating temperatures.

The problem of fuel burnup is serious in that the accompanying decrease in reactivity may limit core lifetime. The techniques available for maintaining reactivity include use of burnable poisons, $U^{238}$ and thorium.

The reactivity of a highly enriched core decreases with time due to fission-product buildup. Assuming that corrosion and radiation damage are not limiting factors, the core life will be limited by total control-rod worth. That is, as fuel is burned, reactivity decreases and must be compensated for by withdrawing control rods. When reactivity decreases to the point where the control rods have been completely withdrawn, the core must be replaced.

The use of burnable poison, as in the APPR, extends the core life. However, this scheme requires a higher initial loading of fuel and has a poor neutron economy. While a burnable poison is parasitic in the sense that it does not contribute to the production of new fissionable material, it does accomplish one of the major objectives of a fertile material in extending the reactivity lifetime of the fuel.

$U^{238}$ has somewhat the same effect as burnable poisons in that reactivity initially increases due to plutonium buildup (assuming the system has a significant conversion ratio). Ultimately, reactivity decreases with fission-product buildup.

The curve of reactivity as a function of time for a thorium system shows an initial decrease in reactivity. This comes from the longer delay in the conversion of $U^{233}$ from $Th^{232}$ as compared with the conversion of $Pu^{239}$ from $U^{238}$. However, reactivity in the thorium system does increase after the initial dip and eventually decreases with time because of fission-product buildup.

As for current practice to extend the core life, the APPR uses burnable poisons, the PWR and EBWR use $U^{238}$, borax-4 and HRT use thorium, and the reactors for Consolidated Edison and Commonwealth Edison will use $U^{238}$ with some thorium. Applicant's copending application discloses a fuel element containing either $U^{238}$ or thorium pellets for extending core life.

Core life may also be extended by a more uniform burnup of fuel throughout the length of a fuel element. Heretofore, the fuel contained within the medial portion of a fuel element would burn up more rapidly than the fuel contained at the ends of the element.

An object of the invention is to provide a fuel element for releasing energy by a nuclear chain reaction while regenerating fertile fuel material therein, such as uranium-238 or thorium-232.

Another object of the invention resides in the provision of a fuel element structure wherein fissionable ceramic fuel pellets in the form of segments of a cylinder, or segments of a cylindrical tube, are biased axially and radially by a compression spring into tight contact engagement against the inner surface of an outer tube to eliminate any gap therebetween, the segments preferably defining a central opening and radial passages leading therefrom to the tube for the transfer of heat to the latter and also to provide space to receive fission-product gases. Higher burnup of the fissionable material is thus achieved by providing additional space to receive the fission-product gases.

Another object of the present invention resides in the provision of a nuclear reactor fuel element comprising a stack of enriched ceramic fuel pellet segments biased radially against the inner surface of an outer tube by means of tapered wedge surfaces formed thereon and a compression spring.

Another object of the invention resides in the provision of a fuel element wherein the fuel pellet segments are formed of high density sintered uranium oxide ($UO_2$)

enriched with uranium-235, the segments being identical to reduce the cost of manufacture.

Another object of the invention resides in the provision of a fuel element comprising concentric inner and outer tubes defining an annular chamber to receive the stack of fuel pellet segments, the inner tube providing a passageway for the flow of fluids to be heated or superheated.

Another object of the invention is to extend the reactivity lifetime of a fuel element by means of a burnable poison, or fertile material, such as U-238 or thorium, disposed within the element to provide substantially uniform burnup throughout the length thereof.

Another object of the invention resides in the provision of a fuel element embodying a rod or tube of burnable poison material, such as boron, said poison being disposed centrally between the fuel segments.

Another object of the invention resides in the provision of a fuel element comprising concentric inner and outer tubes, and a metallic tube containing the burnable poison enclosing the inner tube.

The invention embodies other novel features, details of construction and arrangement of parts which are hereinafter set forth in the specification and claims and illustrated in the accompanying drawings forming part thereof, wherein:

Fig. 1 is a side elevation, partly in section, illustrating a nuclear reactor fuel element embodying features of the invention.

Fig. 2 is an enlarged longitudinal section taken along the line 2—2 of Fig. 3.

Fig. 3 is an enlarged transverse section taken along the line 3—3 of Fig. 2.

Fig. 4 is a detail front elevation showing the fuel pellet in the form of a segment of a cylindrical tube.

Fig. 5 is a side elevation illustrating the fuel pellet as formed with coplanar tapered surfaces for wedge engagement against complementary tapered surfaces on a companion pellet.

Fig. 6 is an end elevation showing the fuel pellet.

Fig. 7 is a detail side elevation showing the poison tube of Fig. 2.

Fig. 8 is a transverse section, corresponding to Fig. 3, illustrating a modified form of the invention.

Fig. 9 is a detail side elevation showing the poison rod of Fig. 8.

Referring now to the drawings for a better understanding of the invention, and more particularly to Figs. 1 through 7 therein, the fuel element 10 is shown as comprising inner and outer concentric tubes 11 and 12, respectively, of stainless steel, or zirconium, having plugs 13 and 14 of stainless steel, or other suitable material, secured to opposite ends thereof to form a leakproof housing having an annular chamber 15 to enclose a plurality of sets of identical fissionable fuel pellets P which are preferably formed of high density sintered uranium dioxide ($UO_2$) enriched with uranium-235. The plugs 13 and 14 are formed with axial passages 13a and 14a which serve as inlet and outlet nozzles for the flow of fluid through the inner tube 11. As illustrated in the drawings, the fuel pellets P are in the form of segments of a cylindrical tube, each pellet having concentric inner and outer arcuate surfaces 17 and 18, respectively, merging with flat coplanar tapered surfaces 19—19a and flat parallel end surfaces 21—21a.

As illustrated in Figs. 1 and 5, the tapered surfaces 19 and 19a on each pellet are disposed in a common plane at an angle "a" of, for example, 5 degrees from the longitudinal axis of the fuel element 10 for wedge engagement against complementary tapered surfaces 19—19a on a companion pellet. The outer arcuate surface 18 of each pellet has radius "R" corresponding to the radius of the inner surface of the outer tube 12. To insure wedge-tight engagement of the fuel pellets against the inner surface of the outer tube 12, the tapered surfaces 19—19a are preferably accurately ground, whereby the ends of companion pellets are offset longitudinally of the fuel element, as indicated at "C" in Fig. 5, for a distance of, for example, 0.015 to 0.030 inch when the pellets define a cylinder having a diameter $b$ equal to the inner diameter of the tube 12.

During assembly of a fuel element 10, as illustrated in Fig. 1, the fuel pellets P are arranged in pairs, as indicated at 1—1a, 2—2a, 3—3a, etc., with the pellet 1 abutting a heat insulation wafer 22 and being wedged radially by its companion pellet 1a. It will be noted that the pellets 2, 3, 4, etc., are in abutting engagement against the pellets 1a, 2a, 3a, etc., respectively, and that the uppermost pellet 6a is engaged by a stainless steel compression spring 23 and a heat insulating wafer 24 to urge the stack of pellets axially against the heat insulating wafer 22, and to bias companion pellets radially against the outer tube 12.

A fuel element of the type shown and described embodies certain important advantages over conventional rod type fuel elements, in that it provides a greater external surface area for the transfer of heat, the fuel pellets are of a form adapted to be compressed to higher densities than cylindrical pellets, and the inner tube permits a transfer of heat from the center of the fuel element. The fuel element is also adapted to replace three or more conventional fuel rods in a reactor core, thereby materially reducing fabrication and reprocessing costs. The fuel element may also embody a burnable poison to control the reactivity of the reactor; whereas, in the use of conventional rod type fuel elements, it has heretofore been necessary to provide a burnable poison externally of the fuel elements. It is also contemplated that the burnable poison material may be alloyed with a metal, such as beryllium or aluminum, to form a tube 26 having a higher coefficient of heat conductivity than stainless steel.

By forming the fuel pellets P of high density, fissionable ceramic materials, such as uranium oxide ($UO_2$) suitably enriched with uranium-235, they have good mechanical strength, good resistance to radiation damage, and a high melting point of approximately 2760° C. As fuel pellets of this type may be formed without a high percentage of interconnecting pores, only small amounts of fission-product gases, xenon and krypton, are released during irradiation. The tubes 11 and 12 are preferably formed of zirconium due to its low neutron absorption properties and the resulting saving through the use of uranium of lower enrichment and the reduction in the critical mass of the uranium.

For control of excess reactivity, a tube of stainless steel 26 or other metal containing a burnable poison, such as boron, is provided within the fuel element to enclose the inner tube 11. As illustrated in Fig. 7, the tube 26 is formed with openings 26a of progressively larger diameter from the medial portion of the tube toward its ends, whereby more poison material is provided medial of the fuel element than at its ends to provide a more uniform burnup of fuel throughout the length of the fuel element and a longer core life.

During assembly of the fuel element the central opening and radial passages defined by the fuel pellets may be filled with a suitable heat conducting gas, such as helium.

The fuel rod, thus shown and described, is adapted for use in a fuel element assembly for a nuclear power reactor, as shown and described in a copending application of James J. Dickson, filed August 26, 1958, Ser. No. 757,381, the disclosure of which is incorporated herein by reference. See also, Nucleonics, vol. 15, No. 7, July 1957, page 94, for Uranium Dioxide Properties and Characteristics.

Figs. 8 and 9 illustrate a modified form of the invention in which the fuel element 10a is similar to the form heretofore shown and described, except that the inner tube 11 and tube 26 have been omitted and replaced by a rod 7 containing a burnable poison material, such as boron, boron carbide, samirium oxide, gadolinium oxide, silver, europium oxide, etc.

In this form of the invention, the rod 7 is mounted at its ends within sockets formed in solid end plugs 13b and 14b secured to opposite ends of the tube 12. The rod is of progressively smaller diameter from its medial portion toward its ends, whereby the medial portion acts to absorb more neutrons than the end portions to provide a more uniform burnup and longer reactivity lifetime.

It is to be noted that the embodiments shown in Figs. 7 and 9 disclose elongated poison members having an axially disuniform mass distribution so that its medial portion contains more poison material than the ends thereof to provide more uniform burnup of the fissionable material and longer reactivity life.

Standard assembling procedures are employed during assembly of the fuel element. Helium or other inert gas atmosphere is present in a dry box or remote assembling installation during assembling and sealing, and ordinary welding and brazing techniques are employed in sealing the plugs 13 and 14 to the ends of the tubes 11 and 12.

This application is a continuation in part of my copending application Serial No. 792,341, filed February 12, 1959.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a nuclear reactor fuel element, a tubular housing, fissionable fuel pellet segments mounted in said housing and defining a central opening, and a burnable poison element extending through said opening, the medial portion of said element containing more poison material than the end portions thereof to provide more uniform burnup of the fissionable material and longer reactivity life, said poison element comprising a length of tubing provided with radial apertures throughout its length, said apertures being formed and arranged to provide more poison material at the medial portion of the poison element than at the end portions thereof.

2. In a nuclear reactor fuel element, a tubular housing, fissionable fuel pellet segments mounted in said housing and defining a central opening, and a burnable poison element extending through said opening, the medial portion of said element containing more poison material than the end portions thereof to provide more uniform burnup of the fissionable material and longer reactivity life, said poison element comprising a length of tubing provided with radial apertures throughout its length, said apertures being formed and arranged to provide more poison material at the medial portion of the poison element than at the end portions thereof, and means urging said fuel pellet segments radially against the inner surface of said housing.

3. In a nuclear reactor fuel element, a tubular housing, fissionable fuel pellet segments mounted in said housing and defining a central opening, and a burnable poison element extending through said opening, the medial portion of said element containing more poison material than the end portions thereof to provide more uniform burnup of the fissionable material and longer reactivity life, said poison element comprising a rod of decreasing cross sectional area from its medial portion toward its ends.

4. In a nuclear reactor fuel element, a tubular housing, fissionable fuel pellet segments mounted in said housing and defining a central opening, and a burnable poison element extending through said opening, the medial portion of said element containing more poison material than the end portions thereof to provide more uniform burnup of the fissionable material and longer reactivity life, said poison element comprising a rod of decreasing cross sectional area from its medial portion toward its ends, said housing comprising a tubular member, plugs closing the ends of said member and having sockets in the inner ends thereof engaging the ends of said poison element.

5. In a nuclear reactor fuel element, a tubular housing, fissionable fuel pellet segments mounted in said housing and defining a central opening, and a burnable poison element extending through said opening, the medial portion of said element containing more poison material than the end portions thereof to provide more uniform burnup of the fissionable material and longer reactivity life, said poison element comprising a rod of decreasing cross sectional area from its medial portion toward its ends, and means urging said fuel pellet segments radially against the inner surface of said housing.

6. In a nuclear reactor fuel element, a tubular housing, a tubular body of fissionable material mounted in said housing, and an elongated metal member containing burnable poison and extending centrally through said tubular body, said member having an axially disuniform mass distribution so that its medial portion contains more poison material than the ends thereof to provide more uniform burnup of the fissionable material throughout the length of the tubular body.

References Cited in the file of this patent

UNITED STATES PATENTS

| 2,832,732 | Wigner | Apr. 29, 1958 |

FOREIGN PATENTS

| 796,989 | Great Britain | June 25, 1958 |
| 788,284 | Great Britain | Dec. 23, 1957 |
| 216,195 | Australia | July 31, 1958 |